United States Patent
Fereyre et al.

(10) Patent No.: US 12,222,453 B2
(45) Date of Patent: Feb. 11, 2025

(54) OPTIMIZED TIME OF FLIGHT VISION CAMERA FOR A MULTI-CAMERA ENVIRONMENT

(71) Applicant: Teledyne e2v Semiconductors SAS, Saint Egreve (FR)

(72) Inventors: Pierre Fereyre, Voreppe (FR); Christophe Mailland, Grenoble (FR); Pierre-Emmanuel Ville, Grenoble (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 1163 days.

(21) Appl. No.: 16/978,073

(22) PCT Filed: Mar. 1, 2019

(86) PCT No.: PCT/EP2019/055158
§ 371 (c)(1),
(2) Date: Sep. 3, 2020

(87) PCT Pub. No.: WO2019/170542
PCT Pub. Date: Sep. 12, 2019

(65) Prior Publication Data
US 2020/0408917 A1    Dec. 31, 2020

(30) Foreign Application Priority Data
Mar. 7, 2018    (FR) ........................................ 1851944

(51) Int. Cl.
*G01C 3/08*    (2006.01)
*G01S 7/484*    (2006.01)
(Continued)

(52) U.S. Cl.
CPC .............. *G01S 7/486* (2013.01); *G01S 7/484* (2013.01); *G01S 17/10* (2013.01); *G01S 17/894* (2020.01)

(58) Field of Classification Search
CPC .......... G01S 7/486; G01S 7/484; G01S 17/10; G01S 17/894
See application file for complete search history.

(56) References Cited

U.S. PATENT DOCUMENTS

| 2014/0160461 A1* | 6/2014 | Van Der Tempel .. G01S 7/4865 356/5.01 |
| 2014/0333917 A1* | 11/2014 | Payne ................... G01S 7/4865 356/5.01 |

FOREIGN PATENT DOCUMENTS

| EP | 3361283 A1 | 8/2018 |
| JP | 2013076645 A | 4/2013 |

(Continued)

OTHER PUBLICATIONS

International Search Report and Written Opinion of the International Searching Authority for PCT/EP2019/055158 mailed May 9, 2019.

(Continued)

*Primary Examiner* — Samantha K Nickerson
(74) *Attorney, Agent, or Firm* — K&L Gates LLP

(57) ABSTRACT

The invention concerns a TOF vision camera and proposes an electronic control circuit comprising a modulation circuit MOD for modulating the carrier clock signal, applying a camera-specific pulse position modulation function k(t) in order to output a modulation clock signal fe which is applied in the camera as a camera light source modulation signal S-LED, in order to control the emission of a series of light pulses SE and in order to synchronously control the N capture phases ST0, ST1, ST2, ST3 of the matrix image sensor CI of the camera. This modulation clock signal fe is (Continued)

such that the clock pulses fe have a constant pulse duration Tp, fixed by the carrier frequency fp, where Tp=½fp, and with a variable time interval Toff between two successive pulses, modulated by said modulation function k(t), said time interval being at least equal to the pulse duration, defining a modulation clock cycle ratio fe that is variable but less than or equal to 50%.

9 Claims, 4 Drawing Sheets

(51) Int. Cl.
  *G01S 7/486*  (2020.01)
  *G01S 17/10*  (2020.01)
  *G01S 17/894*  (2020.01)

(56) References Cited

FOREIGN PATENT DOCUMENTS

| | | |
|---|---|---|
| JP | 2018-21764 A | 2/2018 |
| WO | 2014/181619 A1 | 11/2014 |
| WO | 2017/061104 A1 | 4/2017 |

OTHER PUBLICATIONS

Preliminary Search Report and Annex to the Search Report relating to the French Patent Application 1851944 dated Dec. 6, 2018.

\* cited by examiner

OPTIMIZED TIME OF FLIGHT VISION CAMERA FOR A MULTI-CAMERA ENVIRONMENT

CROSS REFERENCE AND STATEMENT OF PRIORITY

This application is a U.S. National Stage Entry under 35 U.S.C. § 371 of International Patent Application No. PCT/EP2019/055158, entitled OPTIMIZED TIME OF FLIGHT VISION CAMERA FOR A MULTI-CAMERA ENVIRONMENT, filed Mar. 1, 2019, which further claims priority to French Patent Application Number 1851944 filed Mar. 7, 2018, the contents of all of which are incorporated herein by reference in their entirety and for all purposes.

TECHNICAL FIELD

The invention relates to 3D time-of-flight measurement vision cameras, known as TOF cameras (for "Time-Of-Flight"), which use an image sensor (CMOS, CCD) as a matrix receiver. These cameras are notably used for obstacle detection, palletizing, people counting in applications such as machine vision (robotics) and automotive vision (navigation aid, parking), three-dimensional mapping, safety . . . etc., with operating distances of from one meter to a few hundred meters.

STATE OF THE ART

Figure 1:
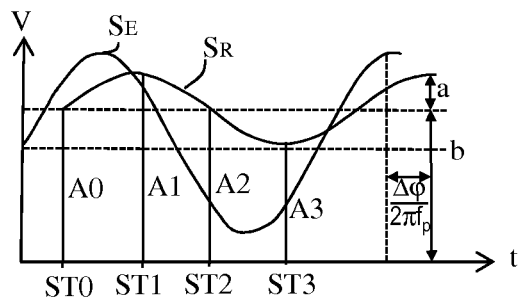
Figure 2:
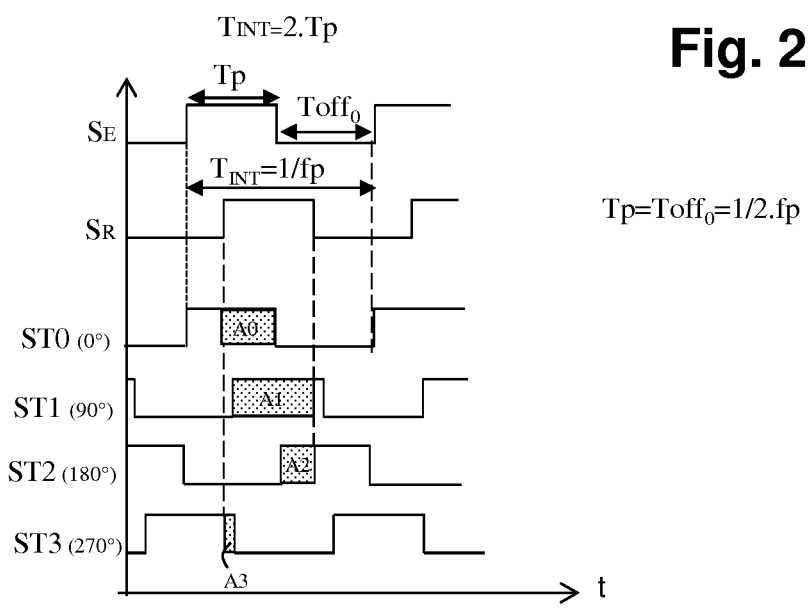

Distance measurement using the time-of-flight measurement technique harnesses in a well-established manner the round trip path of a wave that is reflected by a target. In a TOF camera, and as illustrated in FIGS. 1 and 2, the technique is as follows: The camera emits a light signal $S_E$ towards a target and this signal $S_E$ whose amplitude is sinusoidally-modulated; the camera's image array sensor receives the light signal SR reflected by the target (suitably focused by an optical system) and leads to at least two image capture phases per light integration period synchronized with the light modulation (transmitter/receiver synchronization), to measure the phase shift $\Delta\phi$ of the returning signal. If the modulation carrier frequency is $f_p$ and the integration period is $T_{INT}=1/\text{fp}$. The distance D from the camera to a target that reflects the light (echo) is given by the following equation:

$$D = \frac{C \cdot \Delta\phi}{4\pi \cdot fp}, \quad \text{(EQ. 0)}$$

with C speed of light.

In general, and as illustrated in FIGS. 1 and 2, the sensor captures 4 phases ST0, ST1, ST2 and ST3 over the light pulse capturing period (the phases are therefore out of phase by π/2 rad relative to each other). We can then calculate the amplitude a of the reflected signal $S_R$, its offset h by amplitude, which represents the part of the signal received due to the ambient light and the phase shift $\Delta\phi$ with the emitted signal $S_E$ by means of the three following equations:

$$a = \frac{\sqrt{(A0-A2)^2 + (A1-A3)^2}}{2} \quad \text{EQ. 1}$$

$$h = \frac{A0+A1+A2+A3}{4} \quad \text{EQ. 2}$$

$$\Delta\phi = \arctan\frac{A3-A1}{A0-A2} \quad \text{EQ. 3}$$

The phase shift measurement (at 2kπ rad close) makes it possible to calculate the distance D to the target (EQ.0). We also know how to determine the angular position of the reflecting point with respect to the pixel. . . . This is all well known.

In practice, a square signal modulation is used, rather than a sinusoidal modulation, due to its easy implementation in digital circuits. This is particularly well-suited to TOF vision cameras with CCD or CMOS image sensors. For example, if the image array sensor is a CMOS sensor with active pixels, the transistors integrated into the pixel structure can electronically control the pixels' opening phase, during which the pixels' photosite(s) will integrate the light. The sensor's capture phases thus correspond to the opening commands to the pixels' electronic shutter, and they are applied to all the pixels at the same time (simultaneously). It's known as an overall shutter (as opposed to time-shifted shutter controls, allowing line-by-line integration into the pixel array). These CMOS sensors are capable of integrating for very short periods of about ten nanoseconds, which is suitable for the operating distances ("range" of TOF cameras) intended for anywhere from one meter to a few hundred meters.

The timetable in FIG. 2 illustrates phases A0 to A3 in this square signal modulation context with a cycle ratio of 50%, for a four-phase time-of-flight measurement: the signal $S_E$ emitted by the light source is a train of light pulses at the modulation frequency $f_e$. The width (duration) Tp of the pulses is constant Tp and corresponds to the duration of the clock pulses at the carrier frequency $f_p(\text{Tp}=\frac{1}{2}\cdot f_p)$. This carrier frequency $f_p$ gives the camera's operating distance (EQ.0). It can generally be configured. That is to say that the sensor and the camera's electronics have a clock generation circuit (time base) that generates a carrier clock corresponding to the selected operating distance, configured by an operator or an external control system. This distance is defined according to the camera's use. To get the idea, you need 6 ns per meter. Thus, in practice, Tp can vary from about ten nanoseconds for the shortest distances, to a few hundred nanoseconds for the longest distances.

The matrix receiver and the light source's control electronics are synchronized to adjust the capture phases to the transmission phase. Then, based on a calculation, we can thus determine, for each transmitted pulse, in which of the matrix receiver's capture phase(s) the return signal is found and in what proportions. In each capture phase, a pixel photosite will integrate from 0 to a few photons depending on the coincidence of the given capture phase and a corresponding return signal pulse (and the angular position of the target that reflects the signal). The emitting of a series K of light pulses (K equals 1000 to 2000, for example) allows the photons to accumulate in the photosites at each capture period. This is what makes it possible to obtain a significant signal level at the end of the measurement. After the reading circuit reads the signals A0 to A3 corresponding to the different capture phases and the sensor converts them from analog to digital, they are then digitally exploited in the sensor, in the camera, and/or by an external system, by means of specific algorithms particularly to extract the distance (or depth) information sought, as well as the other information necessary for the given vision application. These aspects are well known and will not be further described, as this is not the subject of the invention.

Each of the capture phases of a $T_{INT}$ integration period is simultaneously applied to all of the pixels. The duration of each phase is identical; it corresponds to the transmission duration Tp defined by the carrier frequency fp specific to the camera. The first STO phase is synchronized and in phase with (set to) the emitting of pulses $S_E$ and this is what provides the (image) sample A0 for equations EQ.1 to EQ.3; the second phase ST1 offset by 90° with respect to the first phase ST0 (phase shift of $\pi/2$ rad) provides the sample A1; the third phase ST2 is offset by 180° from the first phase ST0 and provides the sample A2; the fourth phase ST3 is offset by 270° from the first phase ST0 and provides sample A3. The value of each sample is that obtained (read) by accumulation, after K integration periods synchronized with the κ pulses emitted by signal $S_E$.

Again in a known manner, the various capture phases for detecting the position (the phase) of a reflected light pulse can be conducted simultaneously, when the pixels' structure so allows. For example, the four capture phases can be carried out simultaneously for a 4-photosites per pixel structure. If there is only one photosite per pixel, then the light source is controlled so as to successively emit 4 series of light pulses, each corresponding to a phase shift of 0°, 90°, 180° and 270° respectively, and each series is associated with one of the four capture phases. Each solution (parallel/series) has its advantages and disadvantages (pixel size, precision, measurement time).

The 4 image samples A0 to A3 are finally obtained, one per measurement phase, and the above-noted equations EQ.1, EQ.2, EQ.3 are applied. Although these equations are indeed established for a sinusoidal modulation, they provide a good approximation of the values a, h and $\Delta\phi$. The information D sought (EQ.0) can then notably be extracted.

These measurements and calculations are performed in each pixel, by a digital processing circuit specially configured for this purpose in the sensor after the pixels are read. The position in the matrix of the pixels that effectively detected an echo will then determine the angular positions of the detected target. It should be noted that everything that has just been said regarding a 4-phase measurement similarly applies to a 2 or 3 capture phase measurement.

TECHNICAL ISSUE

These follow-ups concerning the TOF cameras, the measurement principle and their operation having been done, it is understood that when several TOF cameras of the same type are used in the same space, each camera may potentially be hampered by the presence of other cameras in its field of vision: depending on the proximity, angular position and power of their light source, the detected phase shift may be polluted by interference from the light signals emitted by these other TOF cameras, and the distance measurement may be distorted. For example, the distance will be no longer 35 that of the array to be manipulated or of an obstacle on the path, but that of another TOF camera.

There is little margin for maneuver on the cameras' amplitude modulation frequencies to limit their interference, because these frequencies determine the operating distance on the measurement and how precise it is. And this does not solve the problem of independent cameras that are not connected to the same (closed) imaging system. Synchronizing the cameras could be considered so as to establish the transmission times at each source so that the transmission phases do not overlap. In this case, a TOF camera in the system is configured in master mode to synchronize the others. Apart from the fact that this can only be applied to a closed imaging system, in order for such a synchronization to be effective, it would require providing (in the factory) the means to adjust each camera in order to correct the variations in the electronics (technological dispersion). Given the frequencies and duration of the pulses at issue, this would thus require precise synchronization to around a few picoseconds. The use of expensive high-precision clocks cannot even be considered. Such a synchronized solution is thus very restrictive and does not provide the flexibility for the 3D imaging systems to adapt. For example, changing or adding a camera to a system requires reviewing the synchronization. WO 2017/061104 concerns this issue of disruptions in a multi-TOF camera environment and notably proposes modulating the duration of the cycles and in particular, a combination of two measurements: dividing the number of pulses per phase by N, and modulating the duration of each pulse's cut-off time by randomly selecting a cycle ratio value from among a few predefined values, for example by means of a pseudo-random number generator (linear feedback shift register).

SUMMARY OF THE INVENTION

The invention proposes another solution for resolving this issue of multiple TOF cameras that possibly co-function in the same space, which does not have the aforementioned disadvantages.

The idea behind the invention is not to prevent the sources from interfering, but to make it very unlikely. The solution then applies whether or not there are other TOF cameras within a TOF camera's operational space. Which is to say that the proposed solution is no longer restrictive: there's no need to know whether or not there are other cameras in the same space.

More specifically, the invention proposes to use an additional modulation applied to the synchronized signals from the transmission clock (which pulse the camera's light source) and the capture phase clock (which controls the capture phases in the receiver) and this additional modulation is used to modulate the position of the pulses, without changing their duration or width, which is to say without changing the camera's operating distance, for a given carrier frequency: their cycle ratio and the clock frequency are then variable.

Over the duration of a series of light pulses emitted for a time-of-flight measurement, this variability in the pulses' position effectively reduces the proportion of phase disturbances due to other light sources from other TOF cameras, and this remains true even if these other cameras do not implement such a modulation according to the invention. Which is to say that the solution improves the reliability of the distance measurement of a TOF camera that operates in a space where other TOF cameras may operate, whether this system is open (independent cameras) or closed (cameras integrated into a coherent imaging system).

As an advantage, if all the TOF cameras that operate in the same space each implement the invention's solution, each camera is effectively protected against the light interference along with the other cameras in the system and the reliability of the entire system is improved.

The invention therefore relates to a time-of-flight measuring vision camera with N capture phases, N integer of at least 2, which has within the camera housing:

an electronic control circuit for the measurement of the time-of-flight, which receives a carrier clock signal with a carrier frequency defined for the camera, and configured to produce a modulation clock signal at said carrier frequency;

a light emission source modulated by said modulation clock signal in order to emit a series of light pulses towards a target scene, the duration of one pulse and the interval between two pulses defining one cycle ratio;

an image array sensor, configured to control N image capture phases per integration period, which is synchronized with the light pulses emitted by the source, where the integration period corresponds to the carrier clock period.

In the invention, the electronic control circuit includes a carrier clock signal modulation circuit, which applies a pulse position modulation function specific to the camera, synthesized by a periodic signal of its own frequency that is lower than the carrier frequency, such that said modulation clock's pulses applied to the light source and to control the sensor's N capture phases have a constant pulse duration set by the carrier frequency and at the time interval between two variable successive pulses, modulated by said modulation function, said time interval being at least equal to the pulse duration, which defines a variable cycle ratio, but is less than or equal to 50%.

The camera-specific modulation function f(t) is advantageously configurable. In one embodiment, the periodic signal with its own frequency, which is lower than the carrier frequency, is a sinusoidal signal supplied by a phase-locked loop, which is advantageously configurable.

Ideally, the modulation function is such that the modulation clock cycle ratio varies between 10% and 30%.

Preferably, the carrier clock signal modulation circuit is an integrated circuit of the image array sensor, and the modulation clock signal is applied internally to control the time-of-flight measurement capture phases, and supplied externally to synchronize the modulation of the camera's light source.

The invention also involves an image array sensor configured to perform a time-of-flight measurement at N capture phases per carrier clock period, which includes such an electronic control circuit that supplies the modulation clock signal to control the N image capture phases, and as a time-of-flight measuring vision camera's external light source modulation synchronization signal.

Figure 3:
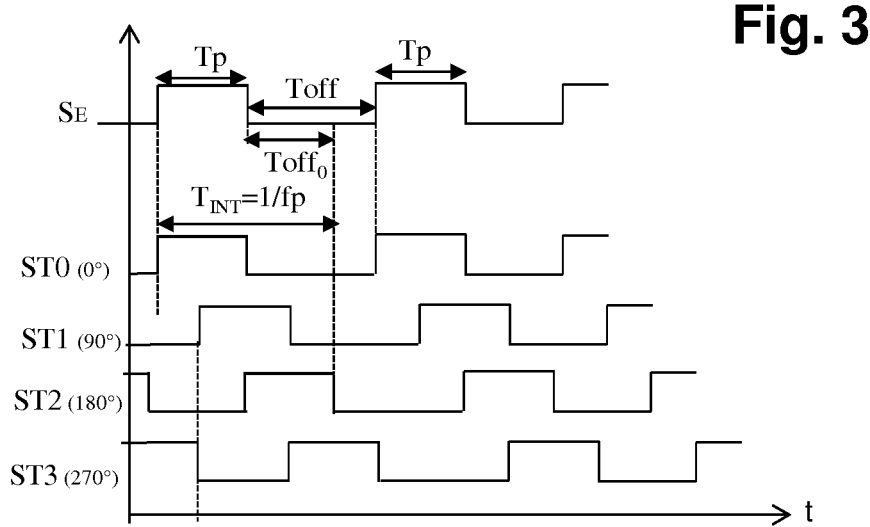
Figure 4:
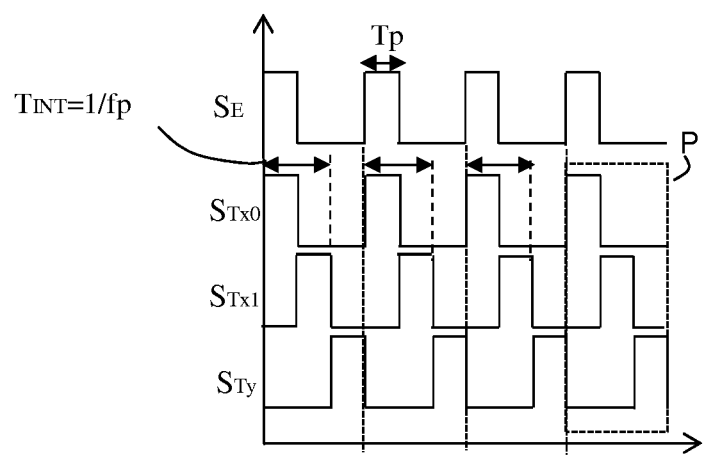
Figure 5:
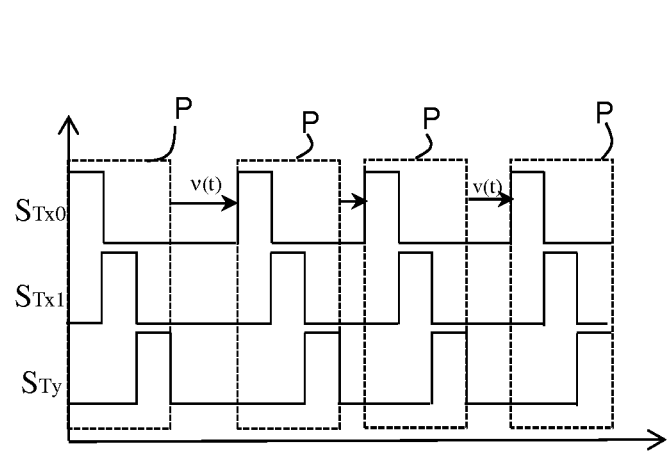
Figure 6:
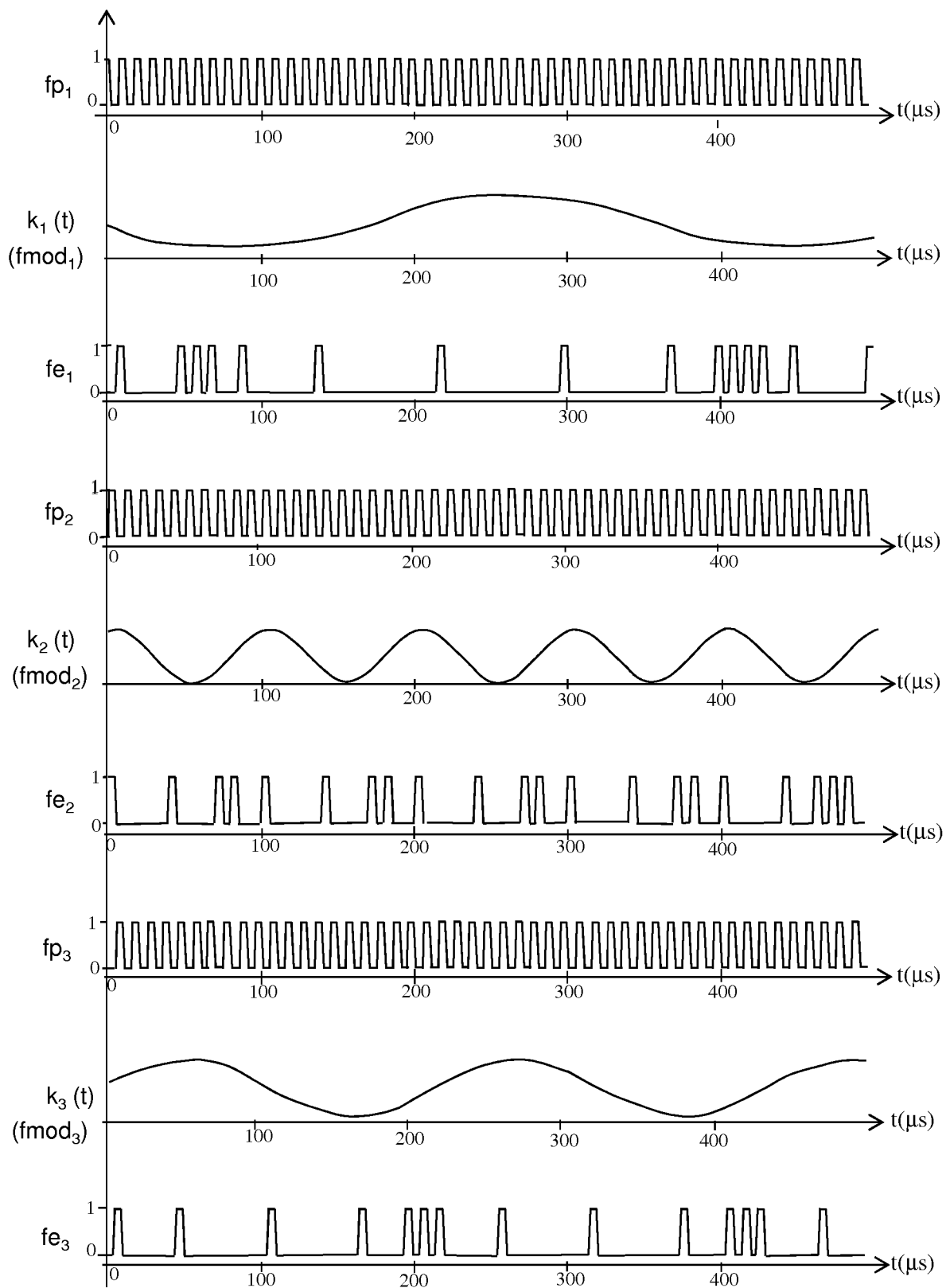
Figure 7:
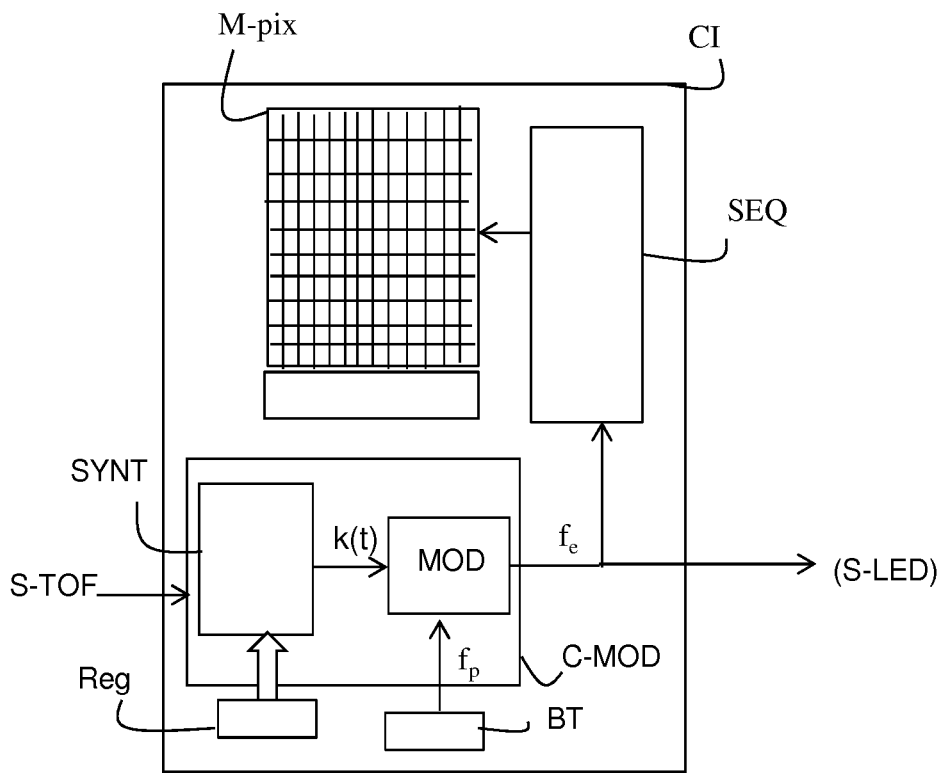
Figure 8:
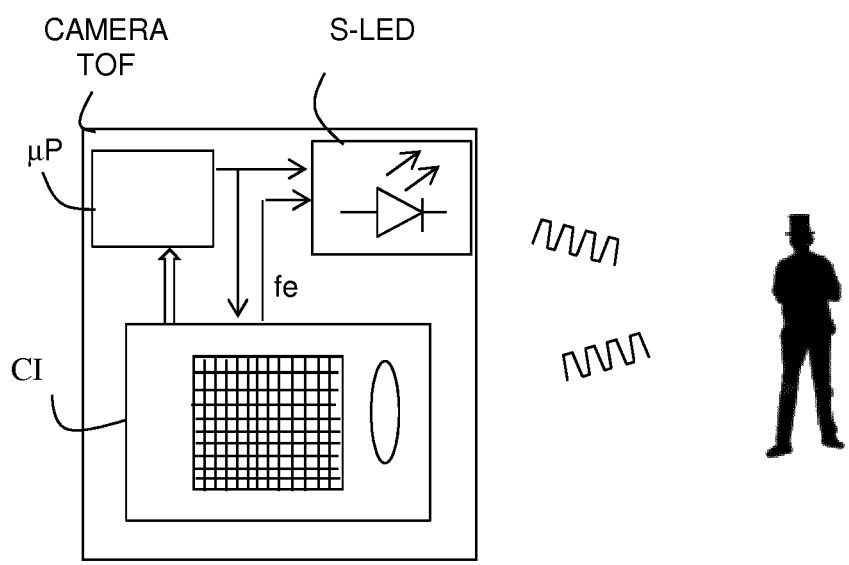

Other characteristics, details and advantages of the invention will emerge upon reading the following description, done with reference to the accompanying drawings as an example and that respectively represent:

FIG. 1, an illustration of the principle for measuring time-of-flight at N capture phases, in order to measure the phase of a light signal reflected by a target;

FIG. 2, a timing diagram of the image capture phases in an array sensor synchronized to the emitting of a train of light pulses emitted by a TOF camera's pulsed light source, for a four-phase time-of-flight measurement according to the state of the art;

FIG. 3, a timing diagram that illustrates the additional modulation of the pulses' position according to the invention, of the synchronized light emission signals and the image capture phases;

FIGS. 4 and 5, similar timing diagrams reflecting a modulation according to the state of the art and according to the invention, in the case of a time-of-flight measurement with 2 capture phases per integration period for time-of-flight measurement (plus an out-of-period capture phase, for the offset measurement representing the ambient light);

FIG. 6, the timing diagrams for the additional modulation carrier clock signals applied to an electronic modulation control circuit for a time-of-flight measurement according to the invention, applied to 3 TOF cameras, and modulation clock signals obtained at the output, for the 3 cameras;

FIG. 7, a simplified block diagram of an image sensor for a TOF camera, including an electronic modulation control circuit according to the invention; and FIG. 8, by schematic representation, a TOF camera including such an image sensor according to the invention.

DETAILED DESCRIPTION

We have previously explained with reference to FIGS. 1 and 2, how the distance measurement can be performed in a TOF camera, by capturing 4 image phases per integration period corresponding to one carrier clock period, the image capture and the emitting of light pulses being controlled in a synchronized manner by a modulation clock. We have seen that the 3 configurations a, h and Δϕ, which are graphically represented in FIG. 1, can then be extracted from equations EQ.1 to EQ.3.

We have seen that the modulation clock signal that defines the duration and the cycle ratio of the emitted light signal $S_E$'s pulses (and therefore the reflected signal $S_R$) and of the sensor's capture phases ST0 to ST3 is a periodic signal, at the frequency $f_e$, with pulses whose duration (width) Tp of the pulses is constant, set by a carrier frequency $f_p$ (Tp=½$f_p$) specific to the TOF camera (which is to say defined or programmed in the camera) and which determines the camera's operating distance for the time-of-flight measurement; and whose Toff interval between two pulses is also constant, and fixed so that the cycle ratio $$R = \frac{Tp}{Tp + Toff}$$

is less than 50%.

According to the invention, and as illustrated in FIG. 3, an additional modulation function is applied that is a position modulation of the modulation clock's pulses. This means that the modulation clock signal (and therefore also each of the signals $S_E$, $S_R$ and ST0 to ST3 that reproduce its shape in a synchronized manner) is no longer periodic: the duration (width) of the pulses remains constant and equal to the value Tp set by the carrier frequency $f_p$ specific to the camera; But the Toff interval between two pulses is variable, with a minimum value $Toff_0$ such that the cycle ratio of each pulse is always less than or equal to 50%. The modulation clock frequency becomes variable.

If we represent the modulation function as a multiplying modulation factor k(t) of a predetermined minimum value (duration), we get:

$$fe = \frac{1}{Tp + k(t) \cdot Toff_0}$$

At a defined carrier frequency, we have at least two parameters of the modulation function: $Toff_0$ and k(t). The modulation factor k(t) is defined over the interval of real ones and included between the positive real values M1 and M2. $Toff_0$ and M1 define the maximum value of the cycle ratio and are selected so that this ratio is less than or equal to 50%; and the value M2>M1 sets a minimum cycle ratio. This minimum cycle ratio will have a value that is generally between 10 and 20% (limits included). If M1=1, then $Toff_0$ must be at least equal to Tp.

An additive modulation factor v(t) of the predetermined minimum value $Toff_0$ could be adopted as another equivalent representation of the modulation function. The modulation clock frequency fe is then written:

$$fe = \frac{1}{Tp + Toff0 + v(t)}.$$

The modulation factor v(t) is defined in the same way over an interval of the actual ones lying between the positive real values L1 and L2. The values $Toff_0$ and L1 set the maximum cycle ratio, which is less than or equal to 50% and the value L2>L1 defines a minimum cycle ratio.

But in view of the variability of the interval between two pulses that are being sought, at a ratio of 1 to 100 of the value Tp, and preferably at a ratio of 10 to 100, which we know how to digitally encode in a few bits, reference is made below to the modulation function, at a multiplying-type modulation factor k(t).

As explained in the Summary of the Invention, by applying a modulation to the position of the modulation clock pulses, there is a reduced probability that the camera's sensor integrates the pulsed light emitted by another TOF camera. In other words, there is a significantly improved probability that the camera integrates only its own light.

This additional modulation principle of the invention is generally applicable to a time-of-flight measurement by an image array sensor with N capture phases with N integer of at least 2. For example, FIGS. 4 and 5 illustrate the case of a time-of-flight measurement with 2 capture phases STx0 and STx1 by integration period (the two capture phases are then offset by 180°), synchronized with the light signal pulse period $S_E$. In this case, the modulation clock is also used to control another capture phase STy outside of the integration period $T_{INT}$, to capture the undisturbed ambient light (uncorrelated) by the return of the pulsed light, in order to deduct this signal offset when calculating the time-of-flight measurement. In the example of FIG. 3, this phase STy is offset by 360° (2π rad).

It should be noted that FIG. 5 corresponds to a representation of the modulation function according to the invention, as an added variable v(t) to a base $Toff_0$ value for the interval between two pulses of the capture phase control cycle. This value $Toff_0$ is determined for the proper functioning of the time-of-flight measurement with 2 capture phases per integration period $T_{INT}$ controlled by the sensor, as a function of the applied carrier frequency fp, of the number of capture phases per period and outside of the integration period $T_{INT}$, and to ensure a maximum cycle ratio of 50%.

Which is to say that the pattern P (Tp, $Toff_0$) of a basic cycle of the N capture phases (phases STx0, STx1 and STy in the example) of FIG. 4 is unchanged, and the effect of the modulation according to the invention is to insert an interval of variable duration v(t) between the repetition of two patterns P (FIG. 5).

The function of modulating the interval between two pulses according to the invention (or function of modulating the pulse position) is preferably a periodic function, which provides for easy and easily-configurable implementation.

This periodic function is preferably a sinusoid whose frequency and amplitude are configured to obtain the desired modulation function k(t), as explained above (min and max cycle ratio). FIG. 6 illustrates such a modulation applied to 3 TOF cameras. In the example, the peak amplitude of the modulation signal $k_i(t)$, i=1 to 3, is approximately the same for all 3 cameras, defining the same variation interval of the cycle ratio (and of the frequency fe), but their $fmod_i$ frequency is different. For each TOF camera, FIG. 6 gives a graphic representation of the carrier signal $fp_i$, of the sinusoidal modulation signal $k_i(t)$ and of the camera's modulation clock signal $fe_i$, for the time-of-flight measurement, applied to modulate the light source and to control the capture phases in the sensor. It can be seen that there are limited recoveries of the three cameras' capture periods.

Such a periodic sinusoidal modulation function can easily be digitally synthesized and configured by a phase-locked loop PLL. Notably, the modulation frequency of each TOF camera is configured by setting the value of the loop's operating frequency divider, and the amplitude, by setting a gain value.

Such a configurable modulation according to the invention distinguishes one TOF camera from another.

Everything just stated above applies similarly to the synthetization of a modulation function with an additive modulation factor v(t) of a predetermined value $Toff_0$ as explained above with reference to FIG. 4 and FIG. 5.

The electronic modulation control circuit for providing a modulation clock signal according to the invention for a time-of-flight measurement can be directly implemented in a TOF camera's matrix sensor as illustrated in FIGS. 7 and 8. Which is to say that the image sensor CI integrated into the camera (in the camera housing) then includes an electronic modulation control circuit C-MOD that includes a SYNT circuit configured to digitally synthesize the modulation function k(t) in accordance with the parameters supplied to the sensor such as the carrier frequency, the number of capture phases, etc., parameters that are stored in practice in a register Reg. As we have seen, this synthesis circuit can be a phase-locked loop PLL. The minimum value $Toff_0$ can be provided as a setting, or determined by the sensor itself (configuration algorithms for the time-of-flight measurement). The circuit outputs the modulation clock signal fe according to the invention in which the position of the pulses is modulated by the function k(t), and this clock signal fe is applied to the sensor's sequencing circuit SEQ to control the various capture phases for the time-of-flight measurement. This modulation clock signal fe is also supplied externally, as the modulation clock signal for the TOF camera's S-LED light source. In practice, this electronic modulation circuit is activated by the camera each time a time-of-flight measurement has to be done (S-TOF signal). In the example of FIG. 8, the samples captured by the image sensor CI corresponding to the various capture phases are supplied to a camera's data processing circuit μP, in order to retrieve by calculation the various 3D imaging data used for the vision application at issue. The electronic control circuit can also be integrated into the camera's control electronics, and it is these control electronics that supplies the sensor with the modulation clock signal fe according to the invention, to control a time-of-flight measurement in the sensor in synchronization with the light source.

The invention claimed is:

1. A vision camera located within a camera housing and configured to measure time-of-flight at N capture phases, wherein N is an integer of at least 2, the vision camera comprising:

an electronic control circuit (C-MOD) configured to receive a carrier clock signal having a camera-defined carrier frequency (fp), and configured to produce a modulation clock signal (fe) at the carrier frequency;

a light emission source (S-LED), modulated by the modulation clock signal (fe), configured to emit a series of light pulses (SE) towards a target scene, wherein a duration (Tp) of a pulse and an interval between two successive pulses (Toff0) define a duty cycle of less than or equal to 50%; and an image array sensor (CI) configured to receive the modulation clock signal and capture image samples corresponding to the N image capture phases (ST0, ST1, ST2, ST3) per integration period (TINT), wherein the N capture phases are synchronized with the light pulses emitted by the source, and wherein the integration period corresponds to a time period of the carrier clock signal, wherein the electronic control circuit comprises a modulation circuit (MOD) configured to generate the modulation clock signal by applying a camera-specific pulse position modulation function (k (t)) to the carrier clock signal, wherein the pulse position modulation function is a synthesized periodic signal having a frequency lower than the carrier frequency such that the pulses of the modulation clock signal (fe) have a constant pulse duration (Tp) equal to ½ (fp), and a variable time interval (Toff) between two successive pulses, and wherein the variable time interval (Toff) is modulated by the modulation function (k(t)), such that the variable time interval (Toff) is at least equal to the pulse duration, thereby defining a variable modulation clock duty cycle which is less than or equal to 50%.

2. The vision camera according to claim 1, wherein the synthesized periodic signal is a sinusoidal signal supplied by a phase-locked loop.

3. The vision camera according to claim 1, wherein the modulation function (k(t)) is a function that is configurable by the camera.

4. The vision camera according to claim 1, wherein the electronic control circuit is an integrated circuit in the camera's sensor.

5. The vision camera according to claim 1, wherein the modulation function is such that the modulation clock duty cycle varies between 10% and 30%.

6. An image array sensor, comprising:

an electronic control circuit configured to receive a carrier clock signal having a carrier frequency (fp) corresponding to an operating distance defined for a time-of-flight measurement made in N capture phases per carrier clock period, wherein N is an integer of at least 2, wherein the electronic control circuit comprises:

a modulation circuit (C-MOD) configured to generate the carrier clock signal by applying a pulse position modulation function (k(t)) to the carrier clock signal, wherein the pulse position modulation function is a synthesized periodic signal having a frequency (fmod1) lower than the carrier frequency, such that the pulses of the modulation clock signal (fe) have a constant pulse duration (Tp) equal to ½ the carrier frequency (fp), and a variable time interval (Toff) between two successive pulses, wherein the variable time interval (Toff) is modulated by the modulation function, such that the variable time interval (Toff) is at least equal to the pulse duration, thereby defining a variable modulation clock duty cycle, which is less than or equal to 50%, and wherein the image array sensor is configured to provide the modulation clock (fe) to a pixel array sequencing circuit (SEQ) of the image array sensor, in order to synchronize the N capture phases with the modulation clock signal and provide an external synchronization signal to a time-of-flight vision camera's light source (S-LED).

7. The image array sensor according to claim 6, wherein the synthesized periodic signal is a sinusoidal signal provided by a phase-locked loop.

8. The image array sensor according to claim 6, wherein the modulation function (k(t)) is a configurable function.

9. The image array sensor according to claim 6, wherein the modulation function is such that the modulation clock duty cycle varies between 10% and 30%.

* * * * *